(12) United States Patent
Hu (10) Patent No.: US 7,596,970 B2
(45) Date of Patent: Oct. 6, 2009

(54) METHOD FOR PRODUCING FIBERS FROM MOLTEN WASTE

(75) Inventor: Yao-Chung Hu, Sinshih Township, Tainan County (TW)

(73) Assignee: Green Material Corporation, Tainan (TW)

(*) Notice: Subject to any disclaimer, the term of this patent is extended or adjusted under 35 U.S.C. 154(b) by 487 days.

(21) Appl. No.: 11/424,837

(22) Filed: Jun. 16, 2006

(65) Prior Publication Data

US 2007/0289336 A1 Dec. 20, 2007

(51) Int. Cl.
*C03B 37/04* (2006.01)
(52) U.S. Cl. .......................... 65/470; 65/475
(58) Field of Classification Search ............ 65/454–470
See application file for complete search history.

(56) References Cited

U.S. PATENT DOCUMENTS

| | | | | |
|---|---|---|---|---|
| 2,972,169 | A | * | 2/1961 | Stalego ........................ 65/463 |
| 3,114,170 | A | * | 12/1963 | Blakey, Jr. et al. ....... 425/379.1 |
| 4,135,903 | A | * | 1/1979 | Ohsato et al. ................. 65/466 |

* cited by examiner

*Primary Examiner*—Steven P Griffin
*Assistant Examiner*—Jodi Cohen
(74) *Attorney, Agent, or Firm*—Shia Banger (57) ABSTRACT

A method for producing fibers from molten waste includes melting waste in a melter into high-temperature molten fluid, discharging the high-temperature molten fluid from the melter, and fiberizing the high-temperature molten fluid to form solid fibers. The solid fibers possess excellent fire-resistant properties and thus can be used as fire-resistant materials.

13 Claims, 12 Drawing Sheets

METHOD FOR PRODUCING FIBERS FROM MOLTEN WASTE

FIELD OF THE INVENTION

The present invention relates to a method for producing fibers from molten waste.

BACKGROUND OF THE INVENTION

Industrial waste often contains toxic substances and waste gases such as dioxin that cannot be melted when the industrial waste is burned in an incinerator at a temperature below 1000° C. The toxic substances and waste gases are usually further heated in a melter to 1500° C. for melting the toxic substances and decomposing the toxic gas. Solid lumps of waste and harmless gas are discharged after hardening and cooling.

The wastes other than industrial products are also often treated in a melter where the wastes are melted, decomposed, combusted, and then cooled to form solid lumps.

However, these solid lumps thus formed are generally buried, for they could not be treated through further heating. Transport of the solid lumps from the melter to the burying site and the burying process are inconvenient and incur cost. Although the molten lumps have been used as graded materials, the utility is low. There is a waste in resources, as the fire-resistant properties of the solid lumps are not well used.

SUMMARY OF THE INVENTION

A method for producing fibers from molten waste in accordance with the present invention comprises melting waste in a melter into high-temperature molten fluid, discharging the high-temperature molten fluid from the melter, and fiberizing the high-temperature molten fluid to form solid fibers. The solid fibers possess excellent fire-resistant properties and thus can be used as fire-resistant materials.

The method may further comprise a step of separating particulates on the solid fibers from the solid fibers.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
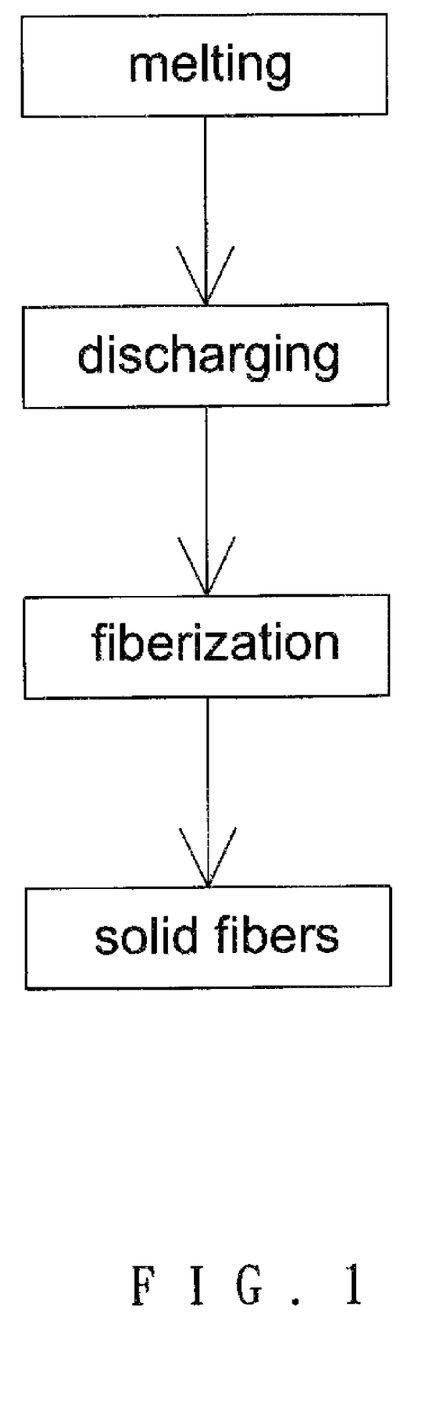
FIG. 1 is a flowchart illustrating a method for producing fibers from molten waste in accordance with the present invention.

Referring to FIG. 1, a method for producing fibers from molten waste in accordance with the present invention comprises melting waste in a melter into high-temperature molten fluid, discharging the high-temperature molten fluid from the melter, and fiberizing the high-temperature molten fluid to form solid fibers.

In the step of melting, ashes, cinders, and/or other wastes are placed in a melter (not shown) and heated at high temperature and thus become molten fluid. In the step of discharging, the high-temperature molten fluid is discharged from the melter to a fiberizing device for subsequent fiberization in which the high-temperature molten fluid solidifies into solid fibers.

Figure 2:
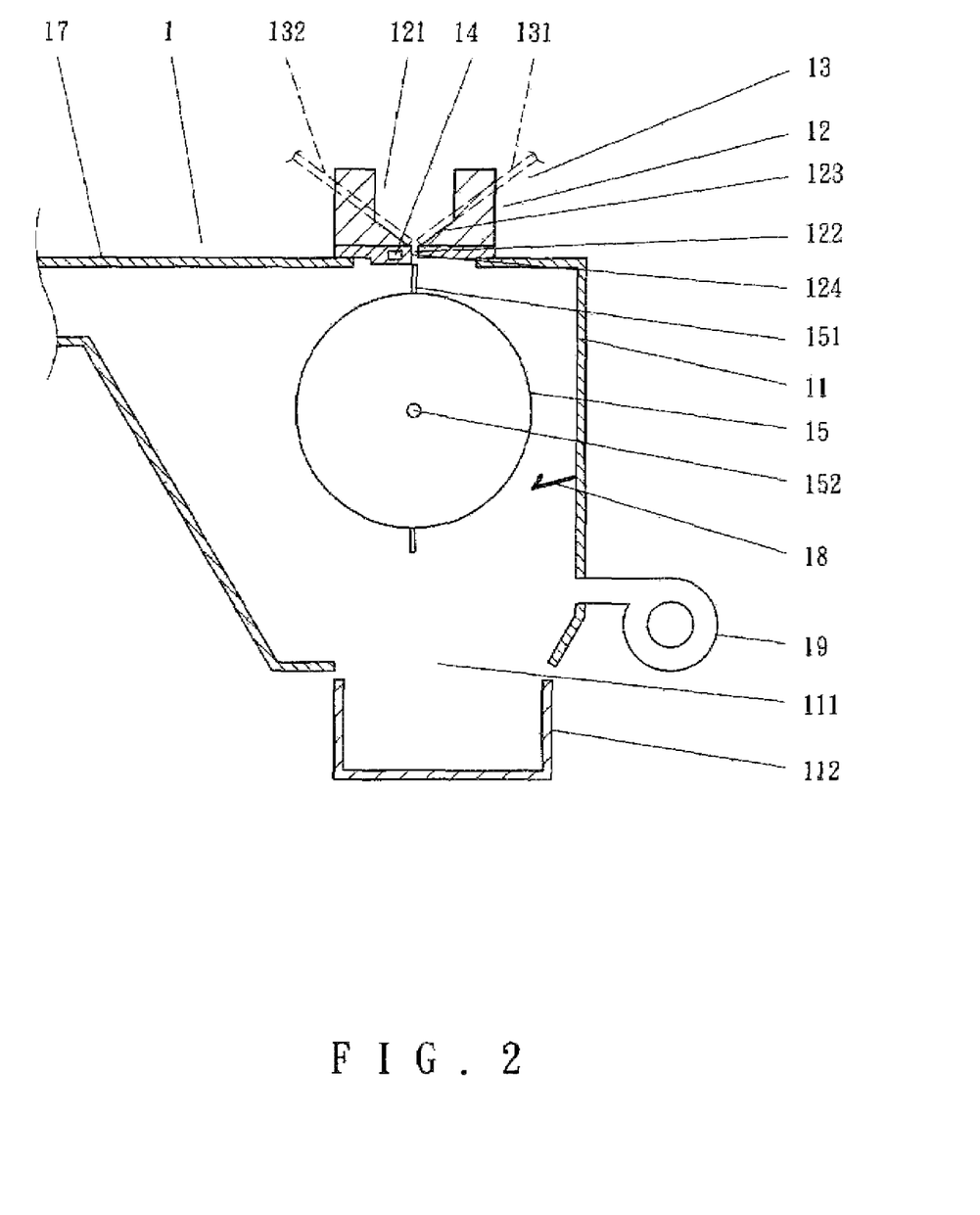
FIG. 2 is a schematic sectional view illustrating a fiberizing device for carrying out the method in accordance with the present invention.
Figure 3:
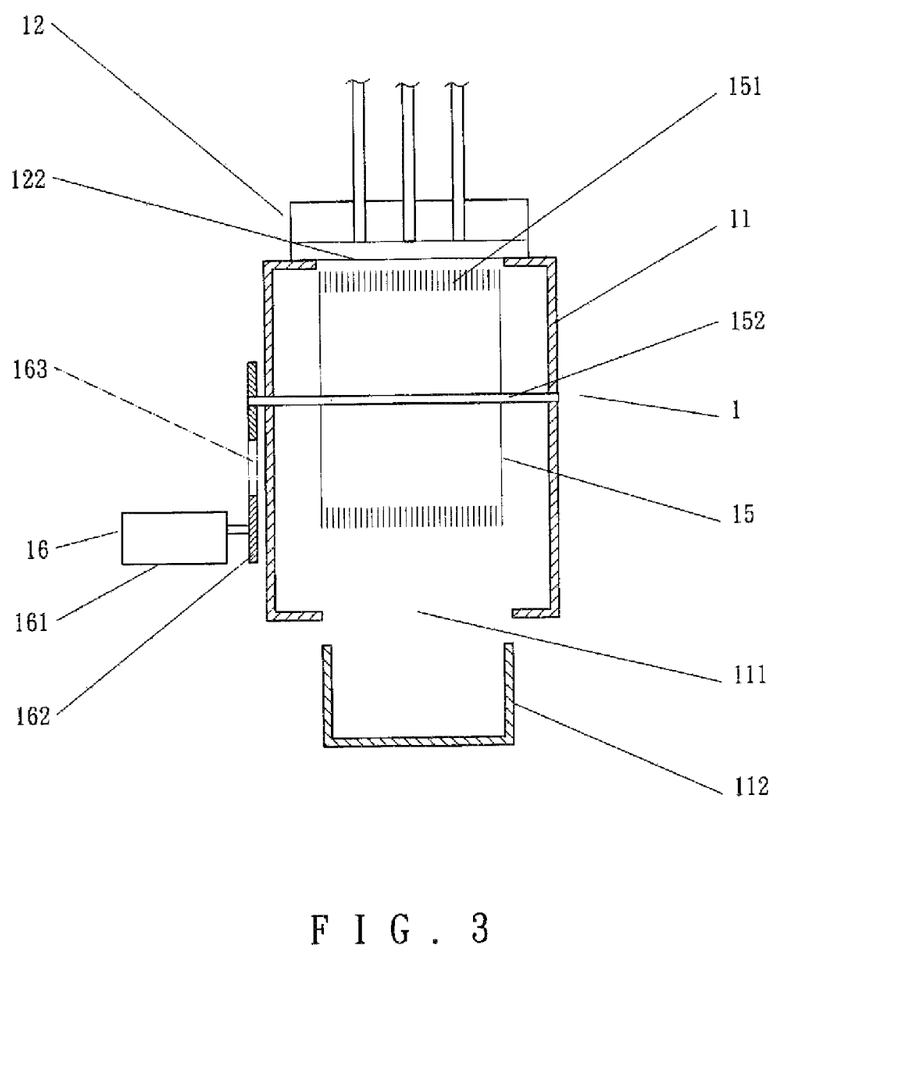
FIG. 3 is another schematic sectional view of the fiberizing device in FIG. 2.

The fiberizing device in accordance with the present invention may be of any type. FIGS. 2 and 3 show an example of the fiberizing device 1. In this example, elongated solid fibers are formed from the molten fluid 4 by gravity dripping.

The fiberizing device 1 is mounted to a location adjacent to the discharge port of the high-temperature molten fluid 4. In this embodiment, the fiberizing device 1 comprises a housing 11 and a receiving seat 12 mounted on top of the housing 11. The receiving seat 12 includes a receiving groove 121 having a discharge port 122. A perimeter wall defining the receiving groove 121 is formed by a material having a surface tension different from that of a circumferential wall defining the discharge port 122. For example, the perimeter wall defining the receiving groove 121 may be made of a material having a larger surface tension, such as bricks made of silicon carbide, whereas the circumferential wall defining the discharge port 122 may be made of a material having a smaller surface tension, such as bricks made of magnesium. Thus, the perimeter wall defining the receiving groove 121 includes a guiding face 123 with a large surface tension whereas the circumferential wall defining the discharge port 122 includes a guiding face 124 with a smaller surface tension and larger capillary holes (see FIG. 4).

Heating devices 13 and 14 are provided for heating the molten fluid 4. In this example, the heating device 13 includes two conductive members 131 and 132 (such as heat-resistant graphite electrodes) mounted on two sides of the receiving seat 12 and electrically connected to a power source (not shown). Thus, the molten fluid 4 become conductive and generate heat while flowing through the conductive members 131 and 132 (self-heating effect). Hence, the discharge port 122 below the receiving seat 12 is kept warm.

Still referring to FIGS. 2 and 3, a rotational wheel 15 is mounted in the housing 11 and driven by a driving device 16 such as a motor 161. The rotational wheel 15 includes a shaft 152. Further, the rotational wheel 15 includes at least one drawing section 151 on an outer circumference thereof. The drawing section 151 includes a plurality of rows of strips (not labeled) that are moved across the discharge port 122 when the rotational wheel 15 turns. The shaft 152 of the rotational wheel 15 is driven by the motor 161 via transmission by, e.g., a gear train 162 and a chain 163.

Still referring to FIG. 2, the housing 11 includes an outlet pipe 17 on an outlet end thereof. Further, a scraper 18 is mounted in the housing 11. When the drawing section 151 moves across the scraper 18, the drawing section 151 will come in contact with the scraper 18. A blower 19 is mounted to a lower portion of the housing 11. Further, an opening 111 is defined in a lower end of the housing 11, and a collection container 112 is mounted below the opening 111.

Figure 4:
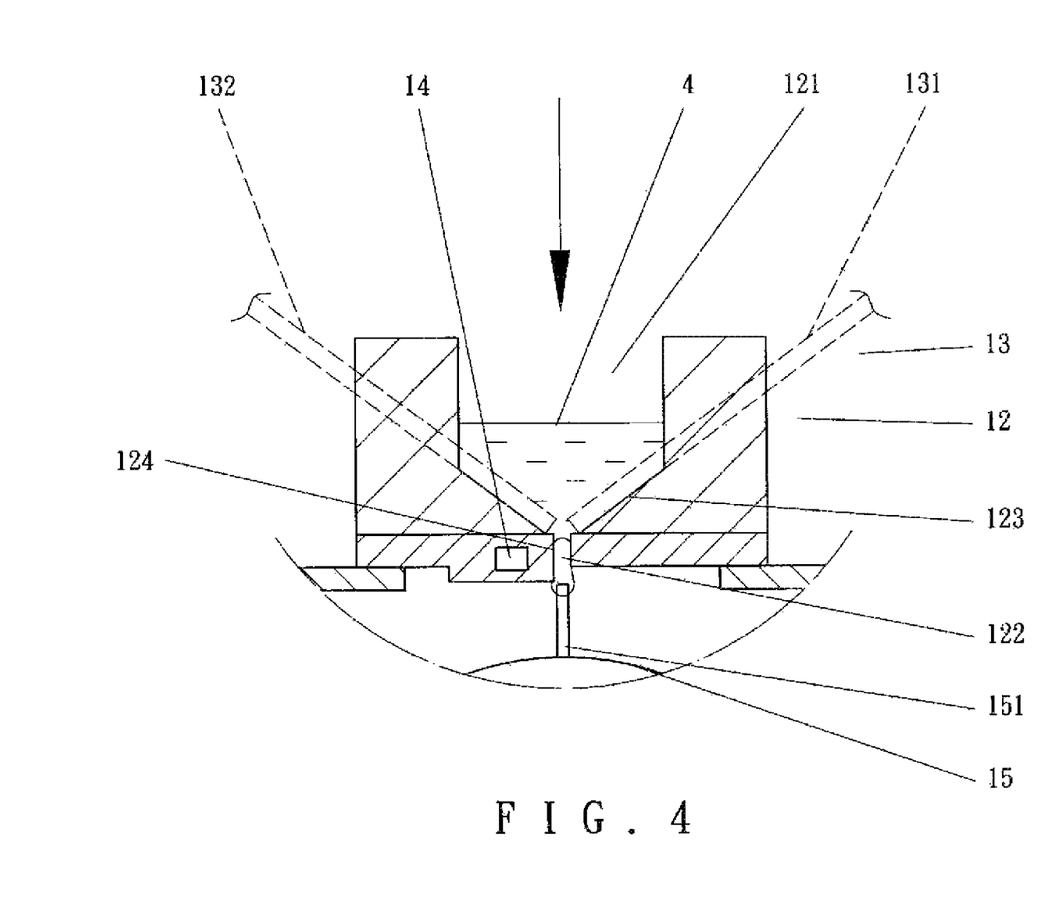
FIG. 4 is a schematic sectional view illustrating feeding of molten waste of the fiberizing device in FIG. 2.

Referring to FIG. 4, the high-temperature molten fluid 4 is filled into the receiving seat 12 and guided downward through the guiding face 123 with a larger surface tension. Hence, the molten fluid 4 flows downward rapidly, and the heating device 13 makes conductive members 131 and 132 become conductive while the molten fluid 4 flowing through the conductive members 131 and 132. Further, the molten fluid 4 become conductive and generate heat to an appropriate temperature due to the impedance of the molten fluid 4 in the molten salt state (self-heating effect). The heating device 14 generates heat at the discharge port 122 below the receiving seat 12, thereby maintaining the temperature of the molten fluid 4. One of the heating devices 13 and 14 may be omitted. Alternatively, heating devices of other types can be used to maintain the temperature of the molten fluid 4, thereby maintaining the high-temperature liquid state.

Figure 5:
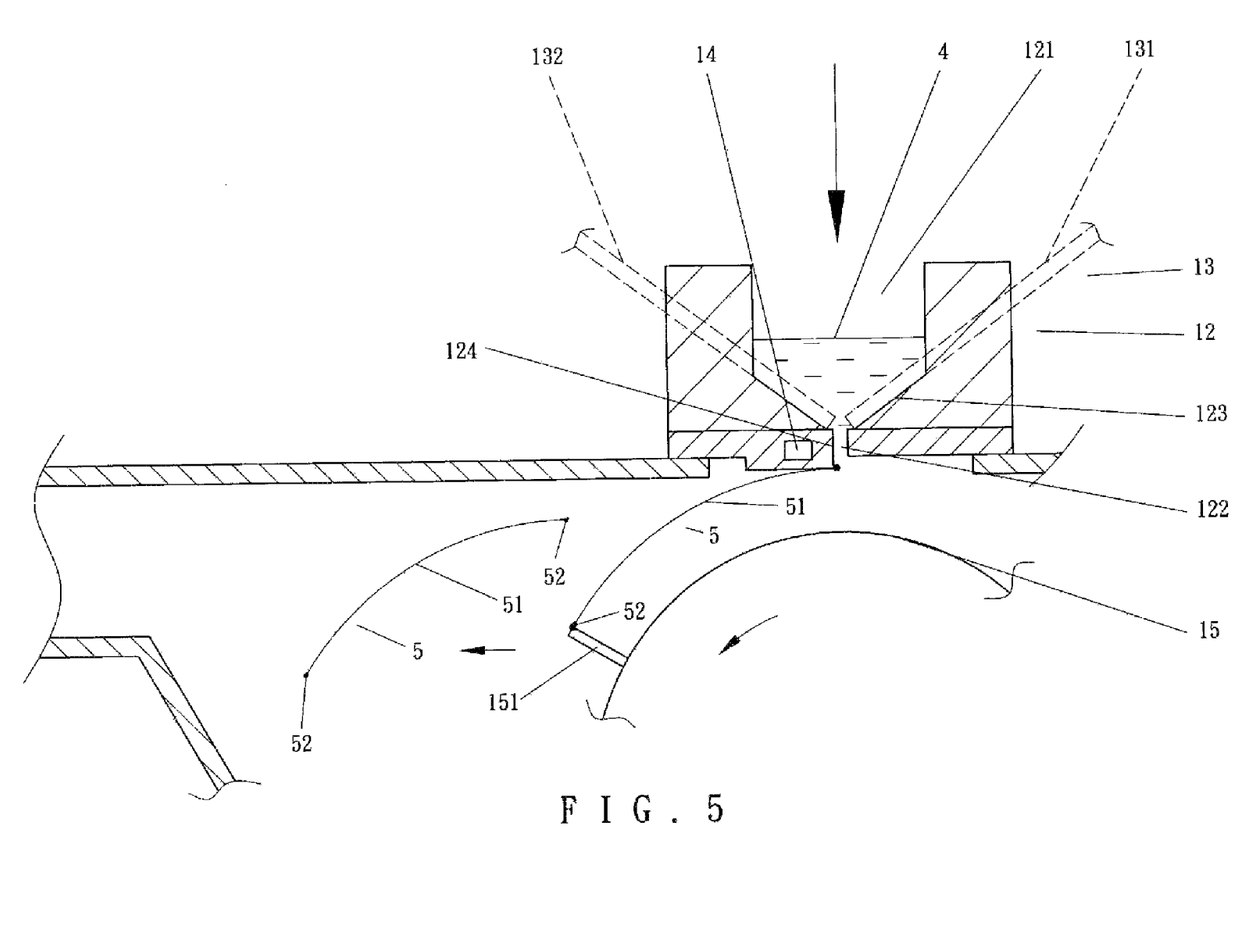
FIG. 5 is a schematic sectional view illustrating formation of a fiber from the molten waste.

The molten fluid 4 is guided out of the discharge port 122. The guiding face 124 with a smaller surface tension and larger capillary holes allows the molten fluid 4 to be adhered to the capillary holes in the guiding face 124. With reference to FIG. 4, when the rotational wheel 15 turns, the drawing section 151 comes in contact with the molten fluid 4 and thus draws the molten fluid 4 away from the discharge port 122. The molten fluid 4 drawn by the rotational wheel 15 extends and becomes a solid fiber 5 after cooling and hardening due to contact with the cool air in the housing 11. The solid fiber 5 has a fiber body 51 and a plurality of particulates 52. Two ends of the fiber body 51 are adhered to the drawing section 151 and the guiding face 124.

Figure 6:
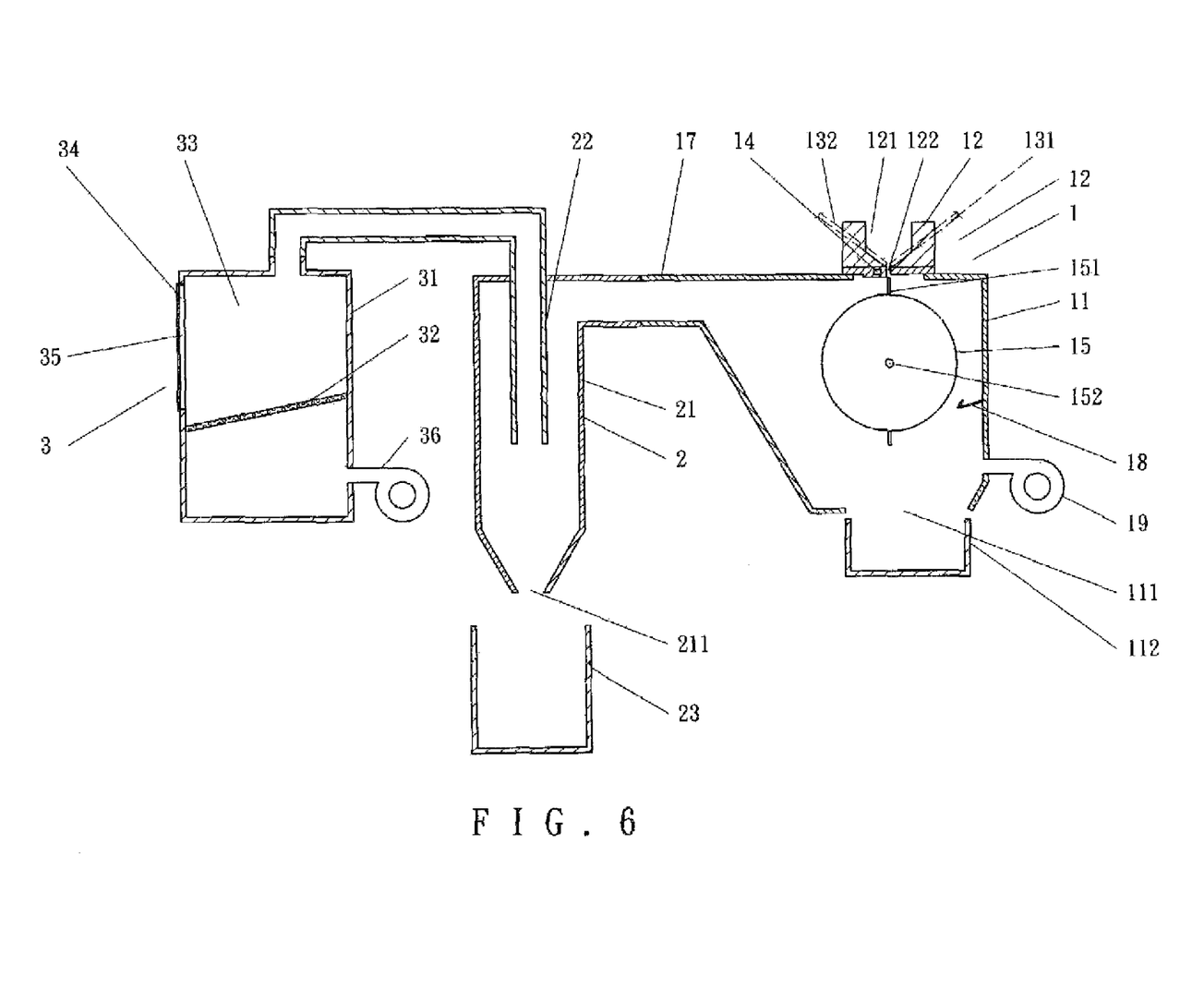
FIG. 6 is a schematic sectional view illustrating a modified example of the fiberizing device in FIG. 2.
Figure 7:
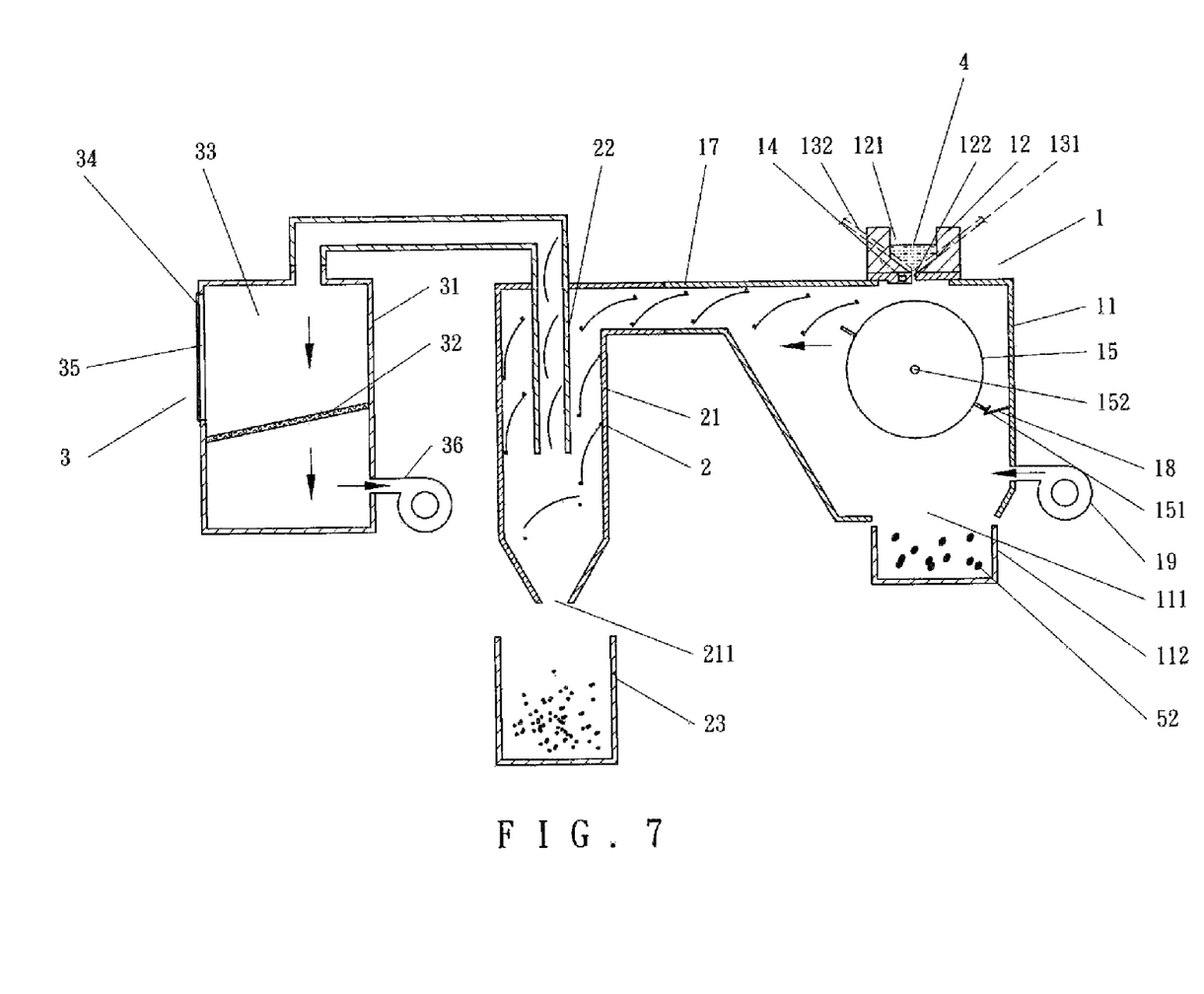
FIG. 7 is a schematic sectional view similar to FIG. 6, illustrating separation operation of the fiberizing device in FIG. 6.

When the tensile force imparted from the rotational wheel 15 to the solid fiber 5 is larger than the adhering force at the ends of the fiber body 51, the solid fiber 5 falls from the rotational wheel 5 and is collected for further use. Referring to FIGS. 6 and 7, the fibers 5 are blown by the blower 19 toward the outlet pipe 17. The drawing section 151 is scraped and thus cleaned by the scraper 18 when the drawing section 151 comes in contact with the scraper 18. Larger particulates 52 are removed and fall into the collection container 112 via the opening 111 of the housing 11.

The diameter of the fibers 5 can be changed by adjusting the rotational speed of the rotational wheel 15. The length of the fibers 5 can be adjusted by changing the number of the drawing section 151 or the diameter of the rotational wheel 15.

The solid fibers 5 produced in accordance with the method mentioned above comprise particulates adhered thereto. Such solid fibers 5 with particulates 52 possess excellent fire-resistant properties and thus can be used in fire-resistant material for construction, such as fireproof doors, fireproof partitions etc. Further, the solid fibers 5 can be combined with concrete to reinforce the concrete. Further, the solid fibers 5 may be used as high-temperature filtering materials for industrial strong acids and strong alkalis. In addition, the solid fibers 5 may be used as materials for weaving or other temperature-resisting or reinforcing purposes.

Referring to FIG. 6, the fiberizing device 1 may further include a separation mechanism 2 and a collecting mechanism 3 for enhancing the separation effect of the particulates 52 and the fiber bodies 51. The separation mechanism 2 includes an outer tank 21 and an inner pipe 22. The outer tank 21 is connected to the other end of the outlet pipe 17 and includes an outlet 211 in a lower end thereof. An end of the inner pipe 22 is located in the outer tank 21, and the other end of the inner pipe 22 extends out of the outer tank 22. A collection container 23 is provided below the outer tank 21.

The collecting mechanism 3 includes a casing 31 in communication with the other end of the inner pipe 22 of the separation mechanism 2. A filtering device 32 is mounted in the casing 31 and includes a filtering net or cloth. A collecting compartment 33 is defined above the filtering device 32. A wall defining the collecting compartment 33 includes an opening 34 sealed by a lid 35. A blower 36 is mounted to the casing 31 and located below the filtering device 32.

Figure 8:
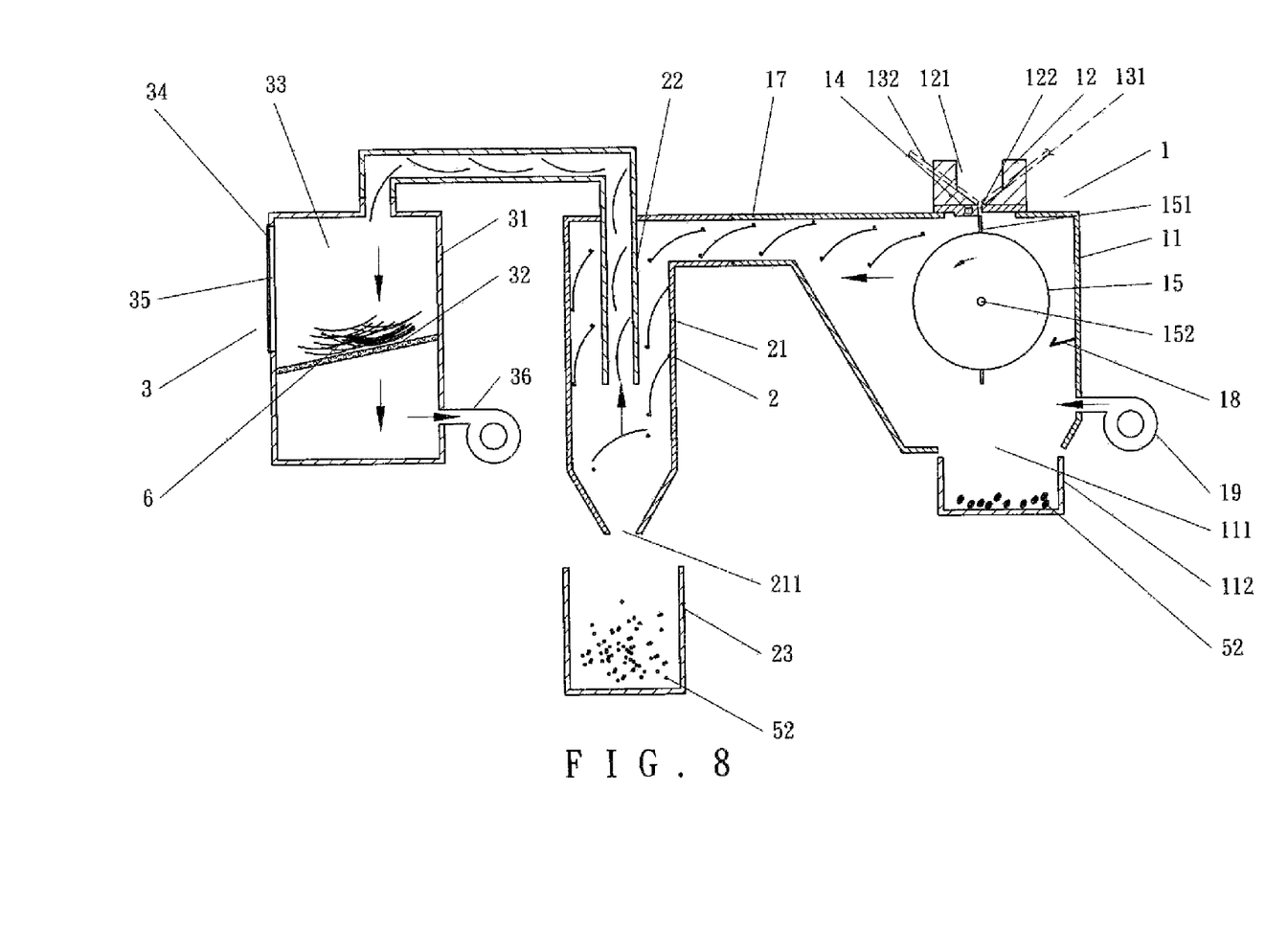
FIG. 8 is a schematic sectional view similar to FIG. 7, illustrating collection of fibers.

With reference to FIGS. 7 and 8, the solid fibers 5 are sucked from the outlet pipe 17 into the outer tank 21 of the separation mechanism 2 under the action of the blower 36. The heavier particulates 52 on the solid fibers 5 falls into the collection container 23 via the outlet 211 of the outer tank 21. The lighter fiber bodies 51 enter the collecting mechanism 3 via the inner pipe 22. The lighter fiber bodies 51 collected in the collecting compartment 33 form solid cotton-like fibers 6 that can be removed when the lid 35 is removed.

The separation mechanism 2 and the collecting mechanism 3 allow effective mass production of the solid cotton-like fibers 6 that possess excellent fire-resistant properties and thus can be used in fire-resistant material for construction, such as fireproof doors, fireproof partitions etc. Further, the solid cotton-like fibers 6 can be combined with concrete to reinforce the concrete. Further, the solid cotton-like fibers 6 may be used as high-temperature filtering materials for industrial strong acids and strong alkalis. Further, the solid cotton-like fibers 6 may be used as materials for turnout coats or other temperature-resisting or reinforcing purposes. The particulates 52 collected in the collection container 23 can be used as materials for temperature-resisting or reinforcing purposes.

Figure 9:
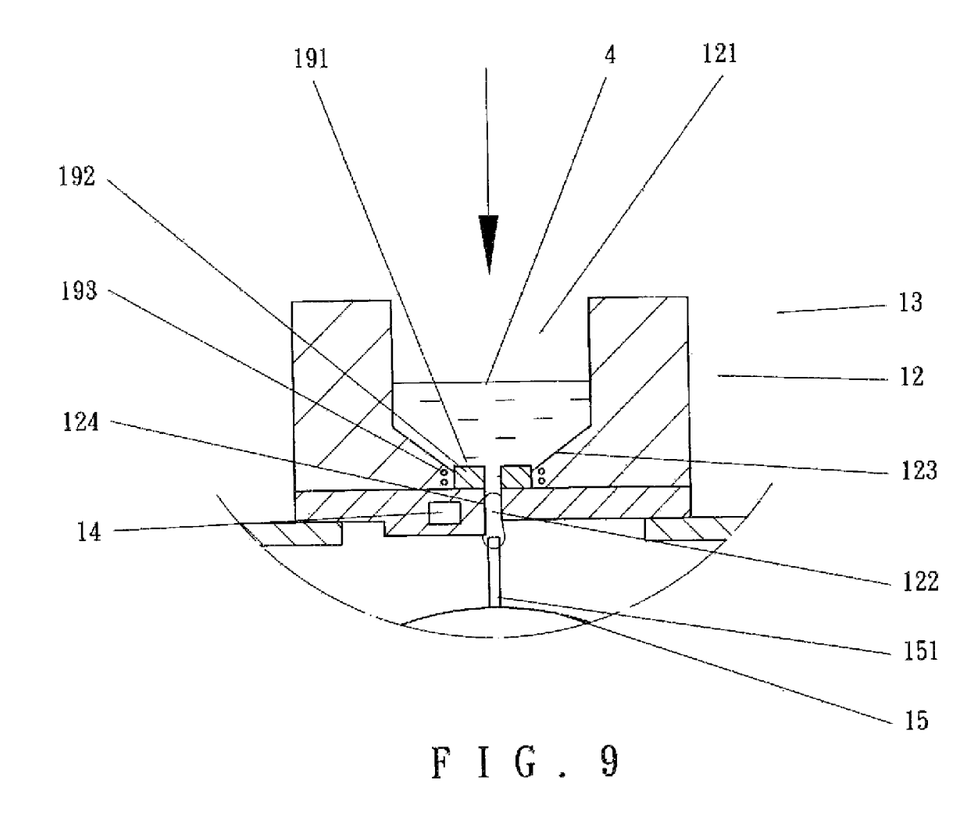
FIG. 9 is a schematic view illustrating another modified example of the fiberizing device of FIG. 2.

FIG. 9 illustrates a modified example of the fiberizing device. In this example, a high-frequency wave heating device 191 is mounted to the receiving seat 12. The high-frequency wave heating device 191 includes graphite 192 or graphite compound and at least one high-frequency wave-sensitive copper ring 193 connected to an external high-frequency wave generator (not shown). When the high-frequency wave generator is turned on, the high-frequency wave-sensitive copper ring 193 generates high-frequency waves and makes the graphite 192 generate heat for heating the molten fluid 4.

A temperature sensor may be provided to detect the temperature of the receiving seat or the molten fluid 4. Further, one or more separation mechanisms 2 may be provided to enhance the separation effect of the particulates 52 and the fiber bodies 51. The collection compartment 33 of the collecting mechanism 3 may be provided with a conveyor (not shown) or other conveying devices (not shown) to enhance the collecting efficiency.

Figure 10:
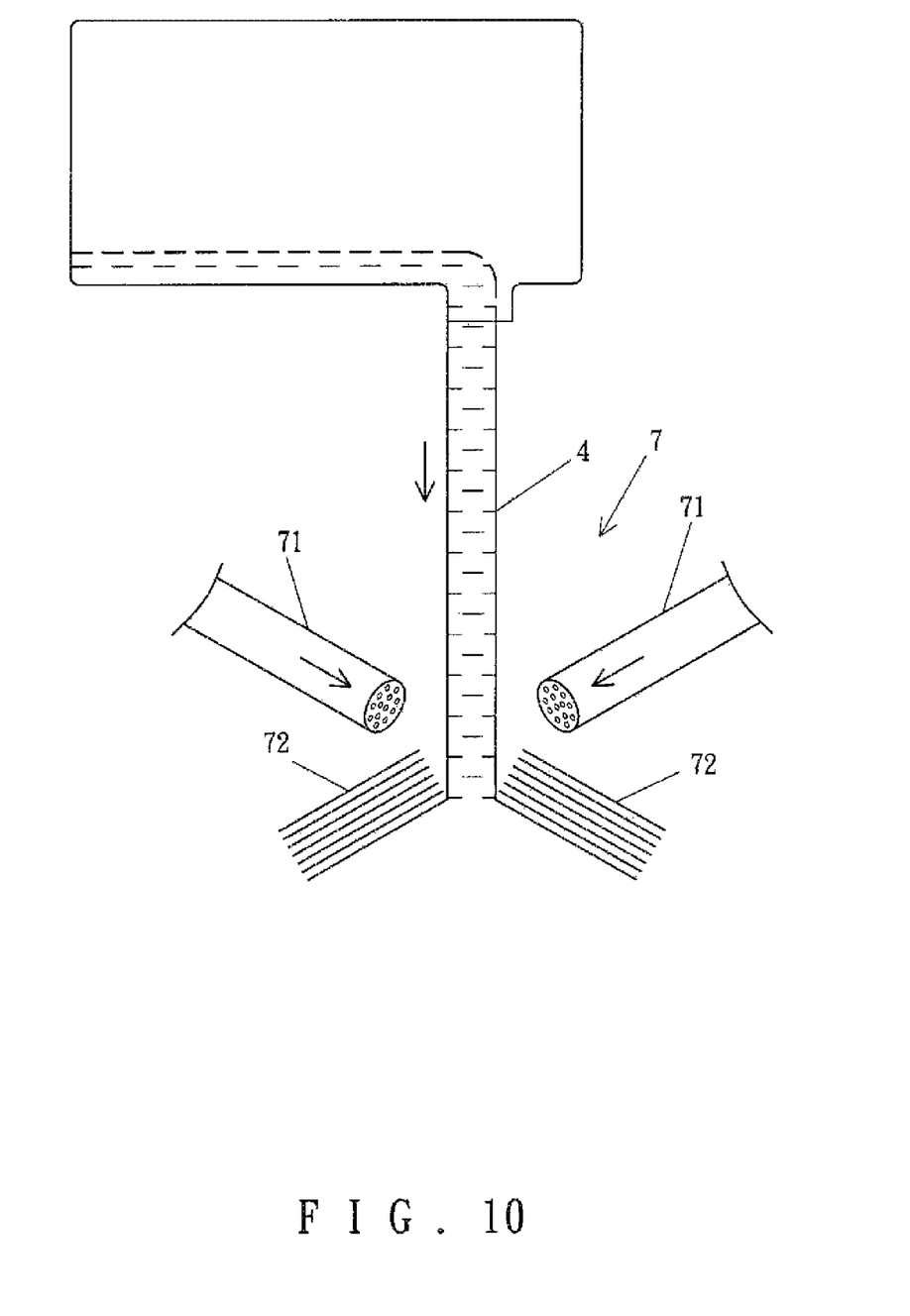
FIG. 10 is a schematic perspective view illustrating another fiberizing device for carrying out the method in accordance with the present invention.

FIG. 10 illustrates another example of the fiberizing device 7 for carrying out the method in accordance with the present invention. In this example, the fiberizing device 7 comprises a plurality of pressurized spraying tubes 71 for ejecting high-pressure cool air to the high-temperature molten fluid 4. Upon impact by the high-pressure cool air, the high-temperature molten fluid 4 is cooled and solidifies momentarily and thus forms solid fibers 72 which may be long or short depending on the needs.

Figure 11:
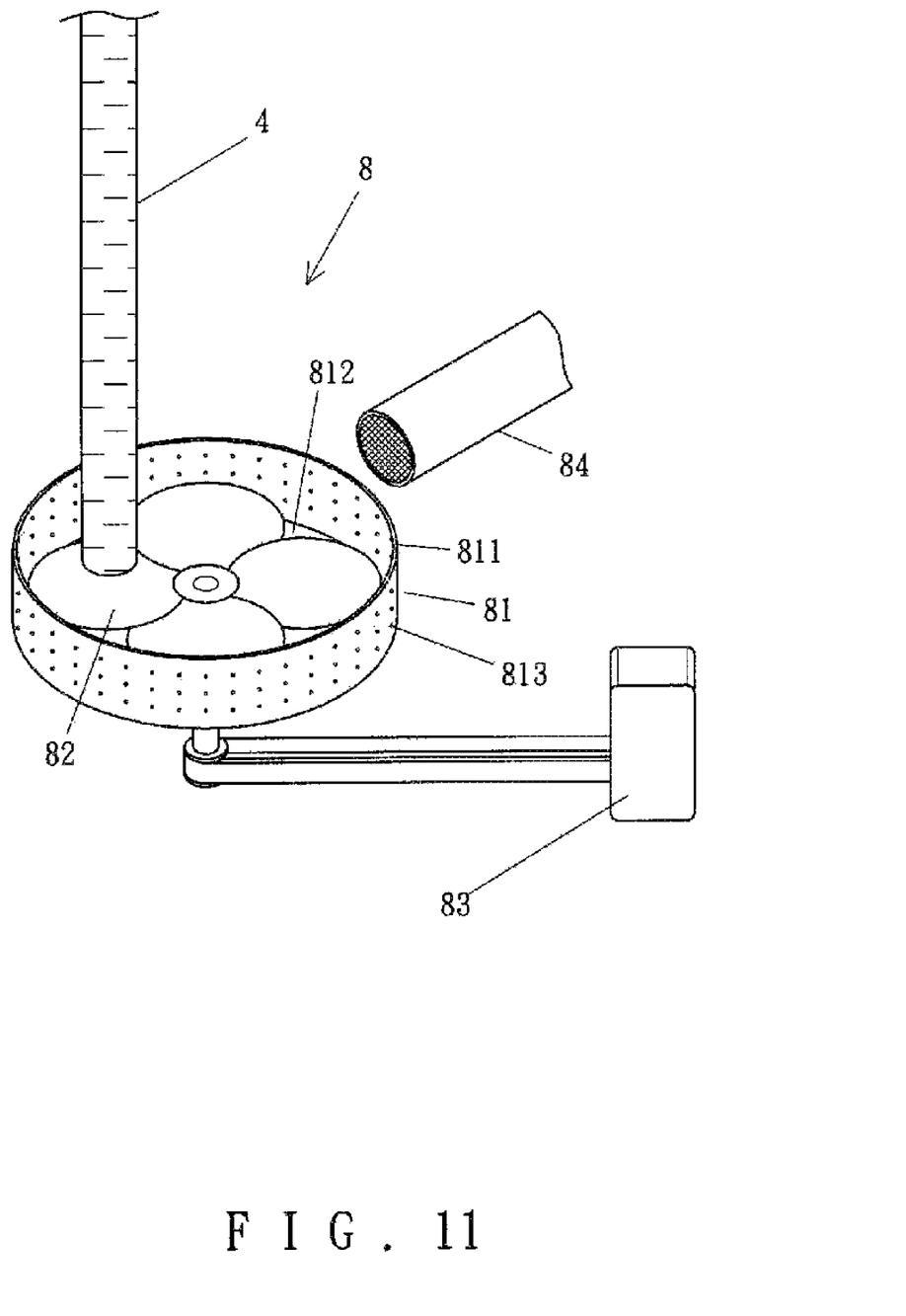
FIG. 11 is a schematic perspective view illustrating a further fiberizing device for carrying out the method in accordance with the present invention.
Figure 12:
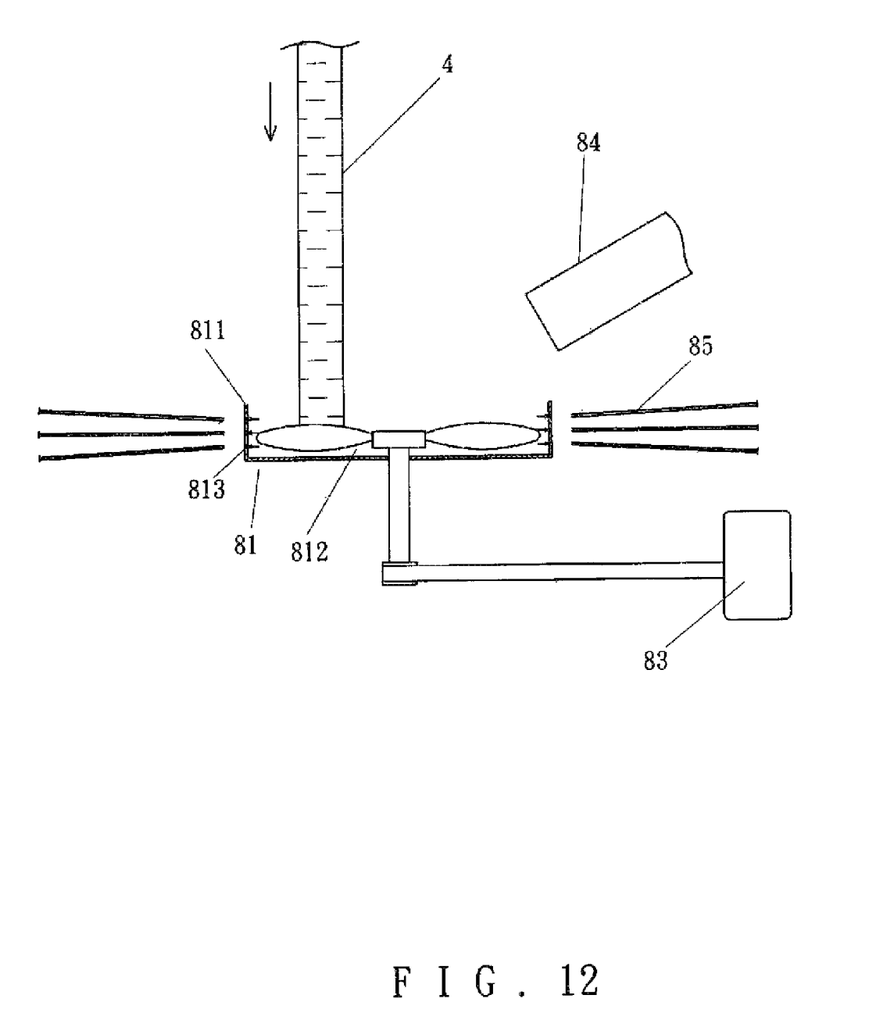
FIG. 12 is a schematic sectional view illustrating operation of the fiberizing device in FIG. 11.

FIGS. 11 and 12 illustrate a further example of the fiberizing device 8 for carrying out the method in accordance with the present invention. In this example, the fiberizing device 8 comprises a disc 81, a plurality of vanes 82, a driving device 83, and a heater 84. The disc 81 and the vanes 82 are made of heat-resistant material. The disc 81 comprises a circumferential wall 811 that defines a compartment 812 and that includes a plurality of through-holes 813. The vanes 82 are mounted in the compartment 812 and driven by the driving device 83. The heater 84 is mounted to a side of the disc 81 for heating the disc 81 and the vanes 82. High-temperature molten fluid 4 enters the compartment 812 and flows on top of the vanes 82. The vanes 82 impart centrifugal force to the high-temperature molten fluid 4 such that the high-temperature molten fluid 4 flows toward the circumferential wall 811 and passes through the through-holes 813, forming solid fibers 85 after cooling. The heater 84 that heats the disc 81 and the vanes 82 keeps the high-temperature molten fluid 4 that are in contact with the disc 81 and the vanes 82 from undesired cooling to thereby prevent the high-temperature molten fluid 4 from undesired solidification due to momentary cooling.

The solid fibers obtained can be subjected to a separating step for separating particulates from the solid fibers. The solid fibers can be combined together to form fiber rods (not shown) whereas the particulates can be used as fillers for fireproof materials as well as other purposes.

As apparent from the foregoing, the method in accordance with the present invention allows recycling of molten waste, which not only saves the cost for burying the molten waste but also produces useful fibers.

Although specific embodiments have been illustrated and described, numerous modifications and variations are still possible without departing from the essence of the invention. The scope of the invention is limited by the accompanying claims.

The invention claimed is:

1. A method for producing fibers from molten waste, comprising:

melting waste in a melter into high-temperature molten fluid;

discharging the high-temperature molten fluid from the melter to a fiberizing device; and fiberizing the high-temperature molten fluid with the fiberizing device to form solid fibers, with the fiberizing device comprising: a housing; a receiving seat mounted on the housing, with the receiving seat including a receiving groove having a discharge port, with the molten fluid being guided into the receiving groove and flowing through the discharge port; a heating device for heating the molten fluid in the receiving seat; and means for drawing the molten fluid from the discharge port to form a solid fiber after the molten fluid comes in contact with cool air, with the discharge port located below the receiving groove, with a perimeter wall defining the receiving groove being formed by a material having a surface tension larger than a material that forms a circumferential wall defining the discharge port such that the perimeter wall defining the receiving groove includes a guiding face with a larger surface tension and that the circumferential wall defining the discharge port includes a guiding face with a smaller surface tension.

2. The method as claimed in claim 1 wherein the high-temperature molten fluid is solidified in the step of fiberizing the high-temperature molten fluid to form solid fibers by one of impacting the high-temperature molten fluid with high-pressure gas, centrifugal force, and gravity dripping.

3. The method as claimed in claim 1 further comprising a step of separating particulates on the solid fibers from the solid fibers.

4. The method as claimed in claim 1 wherein the means for drawing the molten fluid includes a rotational wheel mounted in the housing and having a driving section on an outer circumference thereof, the driving section including a plurality of rows of strips that are moved across the discharge port when the rotational wheel is turned.

5. The method as claimed in claim 4 further comprising a scraper mounted in the housing, with the driving section being scraped and cleaned by the scraper when the driving section comes in contact with the scraper during rotation of the rotational wheel.

6. The method as claimed in claim 5 further comprising a blower for separating particulates on the solid fibers from the solid fibers, with the housing including an opening in a lower end thereof, further comprising a collection container mounted below the opening for collecting the particulates falling from the solid fibers.

7. The method as claimed in claim 1 wherein the heating device includes two conductive members on the receiving seat, with the conductive members being adapted to be connected to a power source to make the molten fluid generate heat when the molten fluid flows through the conductive members.

8. The method as claimed in claim 1 wherein the fiberizing device further includes a separation mechanism and a collecting mechanism.

9. The method as claimed in claim 1 wherein the fiberizing device comprises a plurality of high-pressure spraying tubes that eject high-pressure cooling air to the high-temperature molten fluid to cool and, thus, solidify the high-temperature molten fluid into the solid fibers.

10. A method for producing fibers from molten waste, comprising:

melting waste in a melter into high-temperature molten fluid:

discharging the high-temperature molten fluid from the melter to a fiberizing device; and fiberizing the high-temperature molten fluid with the fiberizing device to form solid fibers, with the fiberizing device comprising: a housing; a receiving seat mounted on the housing, with the receiving seat including a receiving groove having a discharge port, with the molten fluid being guided into the receiving groove and flowing through the discharge port; a heating device for heating the molten fluid in the receiving seat; means for drawing the molten fluid from the discharge port to form a solid fiber after the molten fluid comes in contact with cool air; a separation mechanism; and a collecting mechanism, with the housing including an outlet pipe through which the solid fibers exit the housing, with the separation mechanism including an outer tank and an inner pipe, with the outer tank being connected to the outlet pipe and including an outlet in a lower end thereof, with a collection container being mounted below the opening for receiving particulates falling from fiber bodies of the solid fibers, with the inner pipe including a first end located in the outer tank and a second end, with the collecting mechanism including a casing in communication with the second end of the inner pipe, with a filtering device being mounted in the casing to define a collecting compartment above the filtering device, with a wall defining the collecting compartment including an opening to which a lid is removably mounted, and with a blower being mounted to the casing and located below the filtering device for sucking the fiber bodies of the solid fibers from the outlet pipe into the casing, thereby forming solid cotton-like fibers in the collecting compartment.

11. The method as claimed in claim 10 wherein the number of the separation mechanism is more than one.

12. A method for producing fibers from molten waste, comprising:

melting waste in a melter into high-temperature molten fluid;

discharging the high-temperature molten fluid from the melter to a fiberizing device; and fiberizing the high-temperature molten fluid with the fiberizing device to form solid fibers, with the fiberizing device comprising; a housing; a receiving seat mounted on the housing, with the receiving seat including a receiving groove having a discharge port, with the molten fluid being guided into the receiving groove and flowing through the discharge port: a heating device for heating the molten fluid in the receiving seat; and means for drawing the molten fluid from the discharge port to form a solid fiber after the molten fluid comes in contact with cool air, with the heating device including a high-frequency wave heating device mounted to the receiving seat, with the high-frequency wave heating device including graphite and at least one high-frequency wave-sensitive copper ring, with said at least one high-frequency wave-sensitive copper ring being adapted to be connected to an external high-frequency wave generator, and with said at least one high-frequency wave-sensitive copper ring making the graphite generate heat for heating the molten fluid when said at least one high-frequency wave-sensitive copper ring generates high-frequency waves.

13. A method for producing fibers from molten waste, comprising:

melting waste in a melter into high-temperature molten fluid;

discharging the high-temperature molten fluid from the melter to a fiberizing device; and fiberizing the high-temperature molten fluid with the fiberizing device to form solid fibers, with the fiberizing device comprising:

a disc made of heat-resistant material and comprising a circumferential wall that defines a compartment and that includes a plurality of through-holes;

a plurality of vanes mounted in the compartment;

a driving device for driving the vanes to turn; and a heater for heating the disc and the vanes, wherein the vanes impart centrifugal force to the molten fluid for moving the high-temperature molten fluid through the through-holes so that the high-temperature molten fluid is cooled and solidifies into the solid fibers, and wherein the heater keeps the high-temperature molten fluid that is in contact with the disc and the vanes from cooling to thereby prevent the high-temperature molten fluid from solidification due to momentary cooling.

* * * * *